(12) United States Patent
Chanclou

(10) Patent No.: US 12,136,945 B2
(45) Date of Patent: Nov. 5, 2024

(54) OPTRONIC TRANSCEIVER MODULE

(71) Applicant: Orange, Issy-les-Moulineaux (FR)

(72) Inventor: Philippe Chanclou, Chatillon (FR)

(73) Assignee: Orange, Issy-les-Molineaux (FR)

( * ) Notice: Subject to any disclaimer, the term of this patent is extended or adjusted under 35 U.S.C. 154(b) by 0 days.

(21) Appl. No.: 17/849,423

(22) Filed: Jun. 24, 2022

(65) Prior Publication Data

US 2022/0416887 A1    Dec. 29, 2022

(30) Foreign Application Priority Data

Jun. 25, 2021   (FR) ...................................... 2106821

(51) Int. Cl.
    *H04B 10/079*    (2013.01)
    *H04B 10/40*     (2013.01)
    *H04B 10/50*     (2013.01)
    *H04B 10/60*     (2013.01)

(52) U.S. Cl.
    CPC ....... *H04B 10/07955* (2013.01); *H04B 10/40* (2013.01); *H04B 10/50* (2013.01); *H04B 10/60* (2013.01)

(58) Field of Classification Search
    None
    See application file for complete search history.

(56) References Cited

U.S. PATENT DOCUMENTS

| | | | |
|---|---|---|---|
| 2003/0161637 A1* | 8/2003 | Yamamoto | H04J 14/0206 398/115 |
| 2012/0148241 A1* | 6/2012 | Piehler | H04B 10/07 398/58 |
| 2018/0062825 A1* | 3/2018 | Miao | H04B 10/0795 |
| 2021/0111796 A1 | 4/2021 | Smith et al. | |

FOREIGN PATENT DOCUMENTS

EP    1 339 179 A2    8/2003

OTHER PUBLICATIONS

French Search Report for French Application No. FR2106821, dated Mar. 25, 2022.
Written Opinion on the Patentability of the Invention for French Application No. FR2106821, dated Apr. 1, 2022.

* cited by examiner

*Primary Examiner* — Darren E Wolf
(74) *Attorney, Agent, or Firm* — Knobbe, Martens, Olson & Bear, LLP

(57) ABSTRACT

An optronic transceiver module is disclosed. The optronic transceiver module includes an m to n main optical coupler capable of splitting a downlink signal into n downlink optical signals of the same power to be transmitted in n optical fibres, a first uplink optical coupler capable of splitting an uplink signal into two optical signals split according to a predetermined reference power ratio and delivering a low-power signal and a high-power signal, a first power measurement photodiode delivering a power measurement associated with a first low-power signal, the main optical coupler being capable of aggregating the high-power optical signal and a second uplink optical signal representative of an optical signal received via a second optical fibre, into an aggregated uplink optical signal.

10 Claims, 7 Drawing Sheets

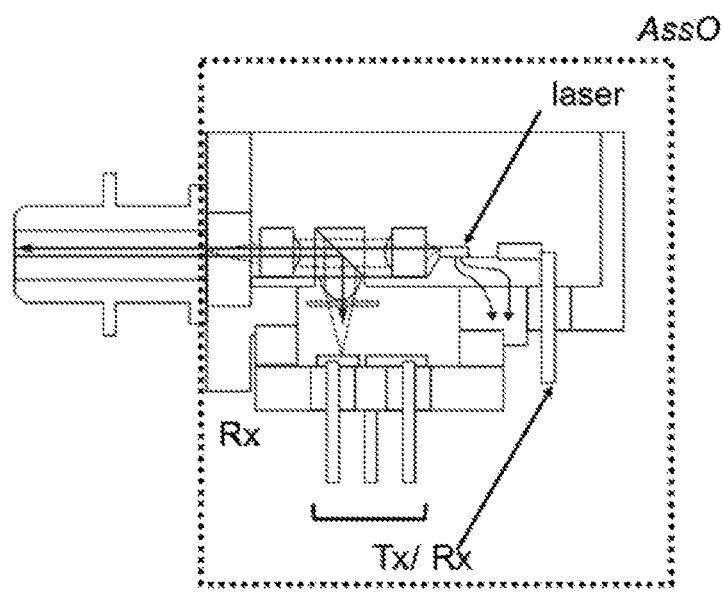
Fig. 5 - prior art

OPTRONIC TRANSCEIVER MODULE

CROSS-REFERENCE TO RELATED APPLICATIONS

This application claims foreign priority to French Patent Application No. FR 2106821, entitled "OPTRONIC TRANSCEIVER MODULE" and filed Jun. 25, 2021, the content of which is incorporated by reference herein in its entirety.

BACKGROUND

Field

The development is within the field of optical fibre telecommunications, and more particularly relates to optical signal transceiver modules in a passive optical network (PON) comprising an optical line terminal, to which are connected such transceiver modules, and a plurality of optical network terminals.

Description of the Related Technology

The function of equipment referred to as optical line terminals (OLT) is to convert electrical signals into optical signals. Such an item of fibre access equipment (located before the last kilometre(s) of the network to bring the fibre to clients) is connected to an optical fibre infrastructure, comprising initially an optical fibre that passes through powered optical couplers to connect a multitude of clients (typically sixty-four). The optronic module of the client is referred to as optical network unit (ONU) or terminal.

The development more particularly relates to the optronic transceiver module, also noted transceiver module, which is plugged into the OLT. This optronic transceiver module comprises an electronic interface comprising electronic components and an optical interface comprising optical components. This optical interface particularly comprises an optical source (laser) modulated with downlink data (from the OLT to the ONUs) and of an optical receiver (photodiode) for receiving uplink data (from the ONUs to the OLT). The two optical signals, downlink and uplink, are bidirectional and propagate in the same optical fibre. These optical signals, downlink and uplink, use different wavelengths that are multiplexed/demultiplexed in the optronic transceiver. Optronic transceiver modules also exist implementing a plurality of PON technologies, that is to say making it possible to transmit uplink signals themselves having different wavelengths and to receive uplink signals themselves having different wavelengths, for different useful bitrates.

Currently, optronic transceiver modules have an optical interface comprising a single optical fibre.

Moreover, there is currently an increase in the "optical budget" of the optronic transceiver modules, that is to say that conventional optronic transceiver modules supporting 28 (twenty-eight) dB of optical budget are progressively replaced by optronic transceiver modules that can support 32 (thirty-two) dB or 35 (thirty-five) dB of optical budget. The use of this additional optical budget may be allocated for example to the additional span, that is to say to the use of longer optical fibres.

However, the number of clients addressed by an optronic transceiver module is limited and the number of ports on an OLT, corresponding to the number of connected optronic transceiver modules, cannot be increased without limitation. Moreover, for economic reasons, the tendency is rather to seek to reduce the number of ports on the OLT.

Therefore, there is a need for a technique making it possible to optimise the number of ports on an OLT while not affecting the allocated optical budget and by addressing a larger number of clients.

SUMMARY

The present technique meets this need by proposing an optronic transceiver module capable of transmitting at least one downlink optical signal (D) respectively in at least one optical fibre and of receiving at least one uplink optical fibre (M-A) via said at least one optical fibre, comprising an optical interface comprising at least one laser capable of generating said at least one downlink optical signal (D) and:
  at least one m to n optical coupler, with m between 1 and n, referred to as main optical coupler (CO1), capable of splitting said at least one downlink optical signal (D) generated by the laser into n downlink optical signals (D1, D2 . . . , Dn) substantially of the same power to be transmitted respectively in n optical fibres,
  at least one first uplink optical coupler (COM-A) capable of splitting said at least one uplink optical signal (M-A) received via a first optical fibre A into two optical signals split according to a predetermined reference power ratio for the split optical signals, the first uplink optical coupler delivering a first low-power signal (M-A-low) and a first high-power signal (M-A-high),
  at least one first power measurement photodiode (PxA) delivering a power measurement associated with a first low-power signal (M-A-low), the main optical coupler (CO1) being capable of aggregating the first high-power optical signal (M-A-high) and at least one second uplink optical signal representative of a second optical signal (M-B) received via a second optical fibre B, into an aggregated uplink optical signal (M-A-B).

Thus, the present technique is based on a novel and inventive solution of implementing an optronic transceiver module connected to an optical line terminal in a passive optical network, making it possible to address a larger number of client terminals without degrading its performances and while maintaining an optimal level of supervision.

For this, a transceiver module according to the present technique particularly comprises at least one "main" optical coupler, m to n, making it possible to split m optical signals generated by a plurality of lasers of the optical interface into n optical signals, substantially of the same power, for their transmission via n optical fibres to n optical network client terminal groups. Thus, a single optronic transceiver module makes it possible to address n client terminal groups instead of one client terminal group, via a single optical fibre, as is currently the case.

In addition, in order to preserve the current level of supervision (in terms of optical power), the present technique provides for associating with this optical coupler at least one photodiode for measuring the power received via at least one of the fibres, advantageously via each of the n fibres and thus be capable of detecting for example a cutoff of one of the fibres, or even of detecting the distance at which the cutoff is located. For this, the optical power measurement photodiode is associated with an "uplink" optical coupler, that samples a percentage of the optical signal received, percentage insignificant for the operation of the transceiver module but sufficient for implementing a supervision.

Finally, the present technique advantageously takes advantage of the considerable increases of the optical budget supported by a single transceiver module, and therefore the increase of the gain in receiving power as well as of the increased sensitivity of the receiver, to provide optimal receiving performances.

According to a particular aspect, the main optical coupler (CO1) is a 1 to 2 coupler and the optronic transceiver module also comprises:
- a second uplink optical coupler (COM-B) capable of splitting an uplink optical signal (M-B) received via the second optical fibre into two optical signals split according to a predetermined reference power ratio for the split optical signals, the second uplink optical coupler delivering a second low-power signal (M-B-low) and a second high-power signal (M-B-high),
- a second power measurement photodiode (PxB) delivering a power measurement associated with a second low-power signal (M-B-low), and where the main optical coupler is capable of aggregating the first high-power optical signal (M-A-high) and the second high-power optical signal (M-B-high), into an uplink optical signal (M-A-B).

Thus, according to this particular embodiment, the main optical coupler is a 1 to 2 coupler, and therefore makes it possible, in downlink, to split the optical signal generated into two signals each transmitted on a distinct optical fibre, and in uplink, to combine the two optical signals respectively received on each of the optical fibres, coming from various client terminal groups as well as to measure the power received on each of the two optical fibres. This embodiment particularly makes it possible to take advantage of an existing configuration of transceiver modules that indeed have two fibre interfaces, currently able to be used respectively for receiving and transmitting. Here, each interface is used bidirectionally, to address twice as many client terminals as the current techniques, typically two groups of sixty-four client terminals, while separately supervising the two client terminal groups linked via the two distinct fibres, thanks to the uplink optical couplers associated with the power measurement photodiodes for each of the fibres.

According to a particular feature, the transceiver module comprises two lasers generating respectively a first optical signal having a first wavelength ($\lambda 1D$) for a first useful bitrate and a second optical signal having a second wavelength ($\lambda 2D$) for a second useful bitrate and the main optical coupler (CO1) is capable of:
- splitting an optical signal corresponding to a combination of the first and second optical signals generated by the two lasers into n downlink optical signals substantially of the same power to be transmitted respectively in n optical fibres, and
- aggregating n first and/or second high-power optical signals each corresponding to a combination of two optical signals received having respectively a first ($\lambda 1m$) and a second wavelength ($\lambda 2m$), into an uplink optical signal having a first ($\lambda 1m$) and a second wavelength ($\lambda 2m$),
- and the optronic transceiver module comprises at least one first uplink optical filtering module (MFM-A) delivering a power measurement associated with each low-power optical signal for each first ($\lambda 1m$) and second wavelength ($\lambda 2m$).

Thus, this particular embodiment makes it possible to implement the present technique in a so-called multi-PON context, that is to say making it possible to support various PON technologies, and particularly various wavelengths for various useful bitrates (typically 1 Gigabit and 10 Gigabits). For this, the optronic transceiver module comprises two lasers making it possible to generate signals with various wavelengths, and the elements of the present technique are capable of operating in the same way as when there is only one signal generated by a laser with one wavelength.

In addition, this particular embodiment also makes wavelength differentiated supervision possible. In this way, it is possible to refine the supervision according to the technique used, which depends on the wavelength. For this, a filtering module is provided to be able to measure the power associated with each wavelength. A plurality of implementations are possible for this filtering module.

For example, the first uplink filtering module (MFM-A) comprises:
- an optical coupler capable of splitting the low-power optical signal having a first ($\lambda 1m$) and a second wavelength ($\lambda 2m$) delivered by the first uplink optical coupler (COM-A) into two signals substantially of the same power each having a first ($\lambda 1m$) and a second wavelength ($\lambda 2m$),
- two optical filters (FA$\lambda 1$, FA$\lambda 2$) delivering, from respectively two signals substantially of the same power each having a first ($\lambda 1m$) and a second wavelength ($\lambda 2m$), respectively a first signal to be measured having the first wavelength and a second signal to be measured having the second wavelength, and
- two photodiodes (PxA,$\lambda 1$, PxA,$\lambda 2$) delivering respectively a power measurement associated with the first signal to be measured and with the second signal to be measured delivered by the optical fibres.

According to a first variant, the filtering module implemented for the wavelength differentiated power supervision first comprises a coupler making it possible to split into two substantially equal power signals the signal received (comprising the two wavelengths) and an optical filter, for each split signal, to filter respectively one and the other wavelength. Subsequently, a power measurement photodiode is implemented after each filter, to measure the power of the signal with a single wavelength. The optical filter may be integrated into the photodiode, for example via an optical process on the face of the photodiode in such a way as to make it sensitive to a single wavelength.

This first variant is simple to implement and inexpensive due to the optical elements used.

According to another example, the first uplink filtering module (MFM-A) comprises:
- an optical multiplexer capable of splitting the low-power optical signal having a first ($\lambda 1m$) and a second wavelength ($\lambda 2m$) delivered by the first uplink optical coupler into a first signal to be measured having the first wavelength and a second signal to be measured having the second wavelength, and
- two photodiodes delivering respectively a power measurement associated with the first signal to be measured and with the second signal to be measured delivered by the optical filters.

According to a second variant, the filtering module implemented for the wavelength differentiated power supervision comprises an optical multiplexer making it possible to filter respectively one and the other wavelength and therefore deliver two signals with a single wavelength. Subsequently, a power measurement photodiode is implemented to measure the power of each signal with a single wavelength.

This second variant has optimal performances in terms of optical losses, due to the use of a multiplexer instead of the coupler/filter combination of the first variant above.

According to a particular aspect, the optronic transceiver module comprises a second uplink optical filtering module (MFM-B) delivering a power measurement associated with each low-power optical signal for each first ($\lambda 1m$) and second wavelength ($\lambda 2m$).

According to a particular feature, the main optical coupler (CO1) is a 2 to 2 coupler having a first input-output for transmitting and receiving the optical signals of the first fibre, a second input-output for transmitting and receiving the optical signals of the second fibre, a third input-output for obtaining said at least one downlink optical signal (D) generated by the laser and delivering the aggregated uplink optical signal (M-A-B) and a fourth input-output connected to an external supervision input-output (S) of the optronic transceiver module.

According to this embodiment, the transceiver module has, in addition to each of the two inputs-outputs for the first and the second fibre, a third supervision input-output, connected to the main optical coupler. This third input-output thus makes it possible on the one hand to supervise the uplink signal of two fibres, received and aggregated by the main optical coupler, and on the other hand to make it possible to implement a reflectometry technique by sending a pulse via the main optical coupler and observing the echo received in return (still the main optical coupler) without needing to disconnect the fibre(s).

According to a particular aspect, the main optical coupler (CO1), said at least one first uplink optical coupler (COM) and said at least one first power measurement photodiode (PxA) are arranged in said transceiver module so as to respect the predetermined size constraints of a mechanical housing of said transceiver module.

Thus, according to the technique proposed, the optical elements added into the transceiver module are arranged so as to be integrated into the standard mechanical housing, i.e. by respecting the size constraints themselves imposed by the space limitations of the optical line terminals (OLT) to which the transceiver modules are connected. For this, a plurality of installation variants are possible, inside a transceiver module, by taking into account however operating constraints specific to the transceiver module, particularly in terms of optical efficiency during transmission and reception and mutual disturbances of the various optical elements. For example, such standard housings, of the LPC type, have optical interfaces spaced 6.25 millimetres apart, and particularly belong to SFP (Small Formfactor Pluggable), SFP+ or XFP families of standards.

According to a particular feature, at least one power measurement delivered by at least one power measurement photodiode is transmitted to the optical line terminal in a diagnostic parameter.

BRIEF DESCRIPTION OF THE DRAWINGS

Other aims, features and advantages of the development will become more apparent upon reading the following description, given by way of simple illustrative, and non-limiting example, in relation to the figures, wherein:

FIG. 5 illustrates an example of optical assembly, according to the prior art;

DETAILED DESCRIPTION OF CERTAIN ILLUSTRATIVE EMBODIMENTS

Figure 1:
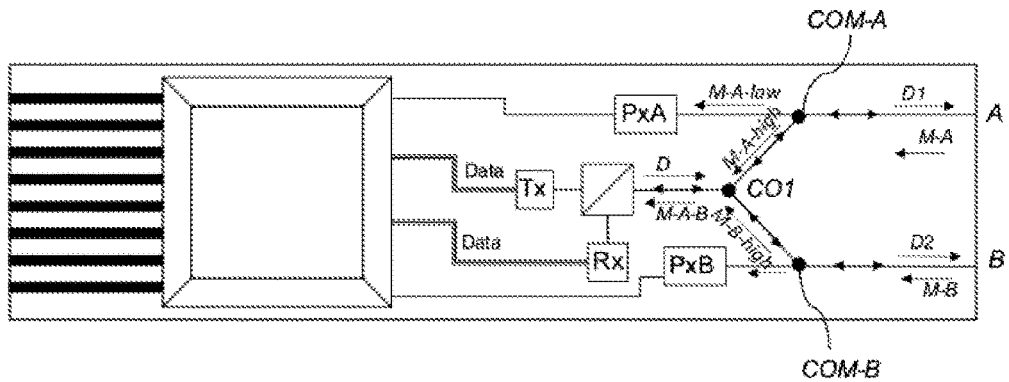
FIG. 1 shows a diagram of a transceiver module according to a first embodiment of the technique proposed.

The general principle of the present technique is based on implementing, in the same transceiver module, at least two bidirectional optical interfaces, i.e. with an uplink and downlink wavelength in each of the channels, so as to be able to address at least two client groups via the same port of the OLT network equipment.

For this, additional optical elements are added inside a standard transceiver module, without needing external modifications to the transceiver module, by taking advantage of the presence of a plurality of fibre outputs provided on such a transceiver module.

It is known to be able to address two client groups (for example two groups of sixty-four clients) from the same OLT port by adding, between a transceiver module and two "1 to 64" infrastructures (making it possible to address the sixty-four clients from the fibre output of the transceiver module), an optical coupler of the "1 to 2" type. With such an implementation, it is therefore possible to address one hundred and twenty-eight clients (2*64). However, the location of the "1 to 2" optical coupler at the OLT, even though not needing modification of the external infrastructure in the urbanisation, poses a plurality of problems:

it is necessary to have a technical area to include these passive elements that are the "1 to 2" optical couplers with the associated optical fibre shuffling, it is not possible to know if one of the two output channels of the "1 to 2" optical coupler is connected or not to client equipment of the ONU type that are active, or this information may prove to be essential during intervention on the shuffling of fibres.

The inventors have therefore sought to overcome these drawbacks while maintaining an optimal optical performance level and an optimal level of supervision and without modifying the housing of a standard transceiver.

For this, the present technique provides to include at least one 1 to 2 coupler (generically m to n, with m ranging from 1 to n) in the optical interface of the transceiver module, thus going against certain reticence to include passive elements in an active optical module, in such a way as to provide two bidirectional optical interfaces by using the two fibre connectors of a known transceiver module.

In addition, a sampling of the optical power of the uplink signal (of ONU to OLT client equipment) in at least one of the two channels is also added, in such a way as to measure this optical power, for example with a photodiode of the metre power type.

This optical power measurement (in one and/or the other of the two channels) may be added in a list of diagnostic parameters exchanged between the transceiver module and the OLT equipment. Indeed, the transceiver modules support diagnostic functions (for example "Digital Optical Monitoring" or DOM) in accordance with industry standards. The diagnostic monitoring controller is available via an I2C ("Inter-Integrated Circuit") bus. Such a "Digital Optical Monitoring" functionality particularly makes it possible for the OLT equipment to read the parameters, such as the optical output power, the optical input power, the temperature and the power voltage of the transceiver module, in real time. Indeed, an exchange channel exists making it possible to exchange data for managing the transceiver module, for example for the "Digital Optical Monitoring" (DOM) functionality information, at the same time as the channel that transmits the Ethernet-type data for example. The diagnostic may be performed in the OLT. It is also possible that the OLT acts as a relay to another item of equipment such as a server that would host the diagnostic. The present technique makes it possible to add thereto the optical power measurement by uplink, thus offering uplink differentiated supervision so as to provide an optimal supervision accuracy, adapted to the configuration of the present technique providing two fibre inputs-outputs for the same transceiver module.

FIG. 1 therefore illustrates this general principle, for a 1 to 2 (therefore with m=1 and n=2) coupler configuration, by a diagram of the main components of an optronic transceiver module capable of transmitting at least one downlink optical signal D respectively in at least one optical fibre and of receiving at least one uplink optical signal M-A via said at least one optical fibre A. For this, the transceiver module comprises an optical interface comprising at least one laser capable of generating at least the downlink optical signal D. According to this first embodiment, the transceiver module also comprises:

- at least one m to n optical coupler (here illustrated 1 to 2), referred to as main optical coupler (CO1), capable of splitting the downlink optical signal D generated by the laser into n (two) downlink optical signals (D1, D2 . . . , Dn) substantially of the same power to be transmitted respectively in n (two) optical fibres,
- at least one first uplink optical coupler COM-A capable of splitting at least the uplink optical signal M-A received via a first optical fibre A into two optical signals split according to a predetermined reference power ratio (for example 1/99) for the resulting split optical signals, so as to deliver a first power signal M-A-low (for example corresponding to $1/100^{th}$ of the uplink optical signal M-A received) and a first high-power signal M-A-high (for example corresponding to $99/100^{th}$ of the uplink optical signal M-A received),
- at least one first power measurement photodiode PxA delivering a power measurement associated with a first low-power signal M-A-low.

Moreover, the main optical coupler CO1 is also capable of aggregating the first high-power optical signal M-A-high and at least one second uplink optical signal representative of a second optical signal M-B received via a second optical fibre B, into an aggregated uplink optical signal M-A-B. This second uplink optical signal representative of the second optical signal M-B received via the second optical fibre B corresponds for example directly to the uplink signal M-B or to a second high-power signal M-B-high (for example corresponding to $99/100^{th}$ of the uplink optical signal M-B received from the second fibre B) if a second uplink optical coupler COM-B (of the 1/99 type) is also implemented, as illustrated in FIG. 1. It should be noted that, in this example illustrated in FIG. 1, it is also provided a second power measurement photodiode PxB delivering a power measurement associated with the first low-power signal M-B-low delivered by this second uplink optical coupler COM-B.

Thus, the technique proposed therefore makes it possible to address a group of clients via the fibre A and a group of clients via the fibre B, multiplying by two the number of clients addressed with a single transceiver module and without modifying the infrastructure external to this transceiver module or to the OLT network equipment. Moreover, this embodiment makes it possible to supervise in a differentiated way the two fibres A and B, and therefore particularly to be able to detect in a differentiated way whether clients are connected on the fibre A or the fibre B.

Figure 2A:
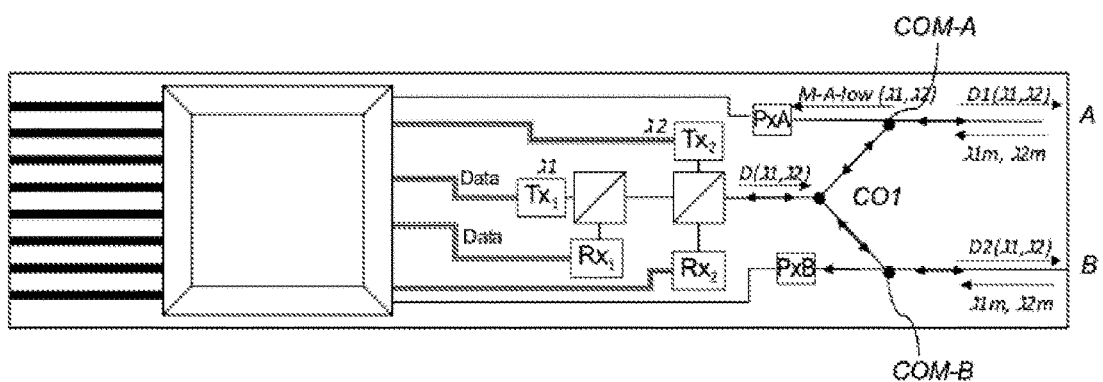
FIG. 2a shows a diagram of a transceiver module according to a second embodiment of the technique proposed.
Figure 2B:
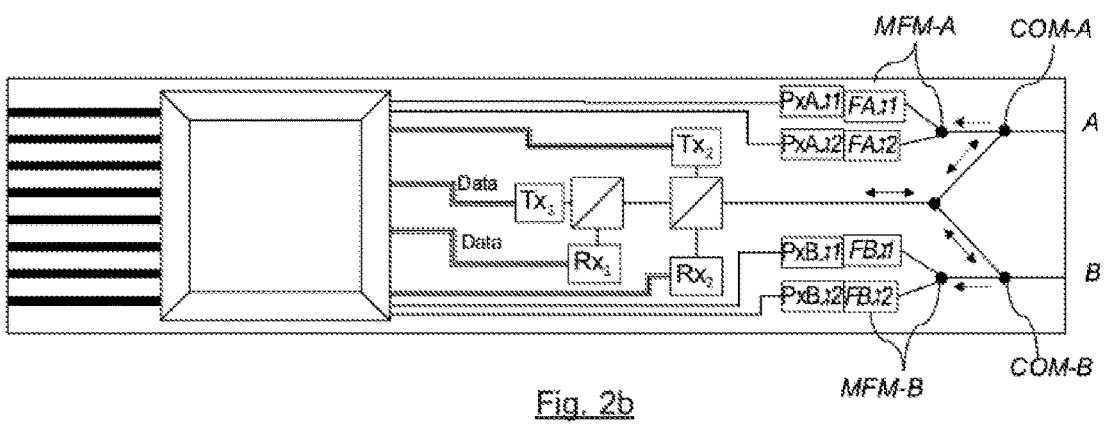
FIG. 2b shows a diagram of a transceiver module according to a first variant of the second embodiment of the technique proposed.
Figure 2C:
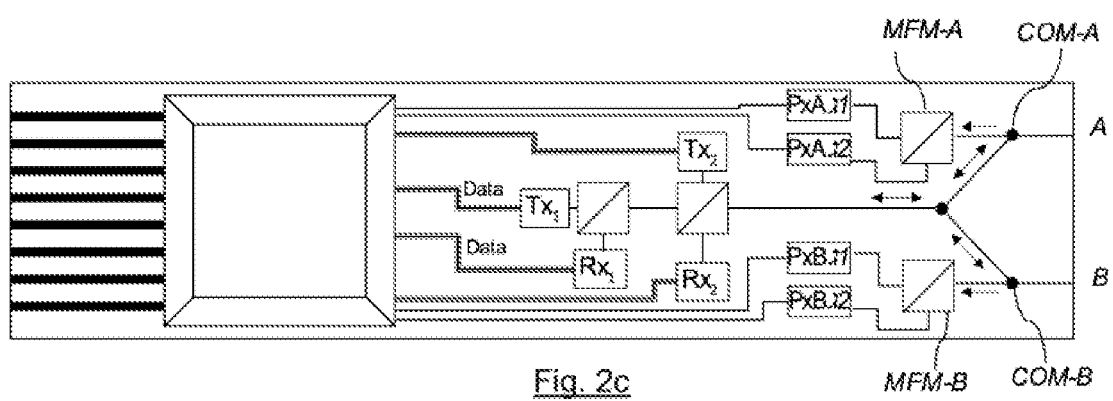
FIG. 2c shows a diagram of a transceiver module according to a second variant of the second embodiment of the technique proposed.

A second embodiment is now described, illustrated in FIGS. 2a to 2c according to a plurality of variants, for a transceiver module incorporating a plurality of PON technologies. For this, the transceiver module comprises two lasers generating respectively a first optical signal of first wavelength λ1D for a first useful bitrate, for example one Gigabit, and a second optical signal of second wavelength λ2D for a second useful bitrate, for example ten Gigabits. Subsequently, the two signals generated are aggregated to deliver an optical signal carrying the two wavelengths λ1D and λ2D. This optical signal is subsequently split by the main optical coupler CO1 added, according to the present technique, in the transceiver module, into two downlink optical signals substantially of the same power to be transmitted respectively in the two optical fibres A and B.

In addition, according to this multi-PON technology, each of the uplink optical signals via the two optical fibres A and B also carry two wavelengths λ1m and λ2m. Thus, the main optical coupler CO1 is capable of aggregating the first and second high-power optical signals (delivered respectively by the first and second uplink optical couplers COM-A and COM-B) into an uplink optical signal also having the first wavelength λ1m and the second wavelength λ2m.

According to this embodiment illustrated in FIG. 2a, the measurement of the power in each of the two channels A and B is global, i.e. undifferentiated in terms of wavelength. Thus, the power measurement for the uplink signal of the fibre A is ensured, as for the first embodiment, by a photodiode PxA delivering a power measurement associated with the first low-power signal M-A-low(λ1m,λ2), which carries the two wavelengths λ1m and λ2m. Symmetrically, the power measurement for the uplink signal of the fibre B is ensured, as for the first embodiment, by a photodiode PxB delivering a power measurement associated with the first low-power signal M-B-low(λ1m,λ2), which carries the two wavelengths λ1m and λ2m.

According to a first and a second variant of this second embodiment, illustrated in FIGS. 2b and 2c, the measurement of the power in each of the two channels A and B is dedicated to each of the two uplink wavelengths, via the implementation of at least one first uplink optical filtering module MFM-A comprising particularly two power measurement photodiodes and delivering a power measurement associated with each low-power optical signal for each first λ1m and second wavelength λ2m.

According to the first variant illustrated in FIG. 2b, the first uplink optical filtering module MFM-A comprises a 1 to 2 optical coupler after the sampling branch COM-A, and an optical filter before each photodiode PxA,λ1 and PxA,λ2 to respectively measure the power of a signal according to the uplink wavelength of a PON technology. Thus, the 1 to 2 optical coupler splits the low-power optical signal, delivered by the first uplink optical coupler COM-A and having a first λ1m and a second wavelength λ2m, into two signals substantially of the same power each having the two wavelengths, and, for each of these two separate signals, an optical filter delivers respectively a signal to be measured having the first wavelength λ1m and a second signal to be measured having the second wavelength λ2m. These two signals to be measured are subsequently processed respectively by two photodiodes PxA,λ1 and PxA,λ2 delivering respectively a power measurement associated with the first signal to be measured of first wavelength λ1m and with the second signal to be measured of second wavelength λ2m. As illustrated in FIG. 2b, a second uplink optical filtering module MFM-B, comprising similar elements, is also provided for the signal received from the optical fibre B.

This first variant of optical filtering module is simple and inexpensive to implement and makes differentiated supervision possible for each wavelength received on each optical fibre. Therefore, according to this first alternative embodiment, the implementation of the present technique not only offers a doubling of the number of clients addressed with a single transceiver module, but also an adapted level of supervision because differentiated according to the uplink wavelength.

According to the second variant illustrated in FIG. 2c, the first uplink optical filtering module MFM-A comprises a multiplexer, after the sampling branch, to split the uplink wavelengths before the power measurement. Thus, the optical multiplexer splits the low-power optical signal, delivered by the first uplink optical coupler COM-A and having a first λ1m and a second wavelength λ2m, into a first signal to be measured having the first wavelength λ1m and a second signal to be measured having the second wavelength λ2m. These two signals to be measured are subsequently processed respectively by two photodiodes PxA,λ1 and PxA,λ2 delivering respectively a power measurement associated with the first signal to be measured of first wavelength λ1m and with the second signal to be measured of second wavelength λ2m. As illustrated in FIG. 2c, a second uplink optical filtering module MFM-B, comprising similar elements, is also provided for the signal received from the optical fibre B.

This second variant of optical filtering module is simple to implement and makes differentiated supervision possible for each wavelength received on each optical fibre, by limiting the optical losses thanks to the use of a multiplexer instead of a coupler associated with an optical filter as in the first variant. Therefore, according to this second alternative embodiment, the implementation of the present technique also offers a doubling of the number of clients addressed with a single transceiver module and an adapted level of supervision because differentiated according to the uplink wavelength.

Figure 3:
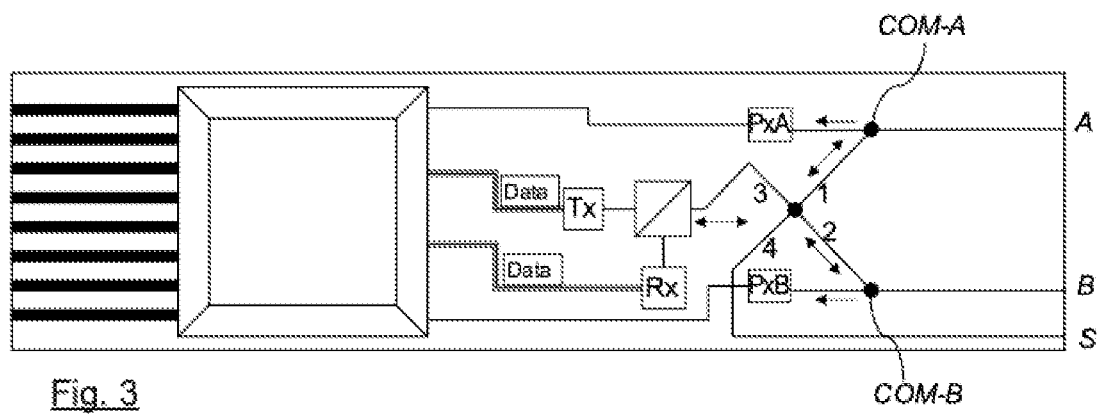
FIG. 3 shows a diagram of a transceiver module according to a third embodiment of the technique proposed.

It is now presented, in relation to FIG. 3, a third embodiment making it possible to provide a third "branch" in the optical interface of the transceiver module, to particularly make it possible to implement the additional diagnostic, by optical time domain reflectometer (OTDR), or sampling of uplink signals for an external supervision.

Indeed, by starting from the principle that an optical coupler, such as that added according to the various embodiments of the present technique, has as much optical loss for a 1 to 2 (1 to n) as 2 to 2 (n to n) configuration, the addition of a fourth input-output to this optical coupler, connected to an external supervision input-output S of the transceiver module, has no impact in terms of optical loss of the entire transceiver module.

Thus, this third external input-output S (the first and second inputs-outputs being linked respectively to the optical fibres A and B) makes it possible, on the one hand, to implement a technique for diagnosing the fibre infrastructure, by connecting thereto, on the outside of the transceiver module, an item of metrological equipment for carrying out the echometry. The principle, known, consists in sending a pulse, which, in the present implementation, is transmitted into each of the fibres A and B via the main optical coupler CO1. Subsequently, still via the main optical coupler CO1, the return signal, i.e. the echo of the pulse, is observed (particularly the power and the return time) in order to perform a diagnostic particularly making it possible to detect weak or cutoff points of the signal on the infrastructure to the client groups. The main advantage of this implementation resides in the fact of not having to disconnect one or other of the fibres during use to perform this diagnostic.

On the other hand, this third external input-output S makes it possible to implement a technique for monitoring the uplink traffic via the fibres A and B, particularly when the global system is in nominal operation, i.e. when the clients are connected and that an Internet traffic is observed.

Figure 4:
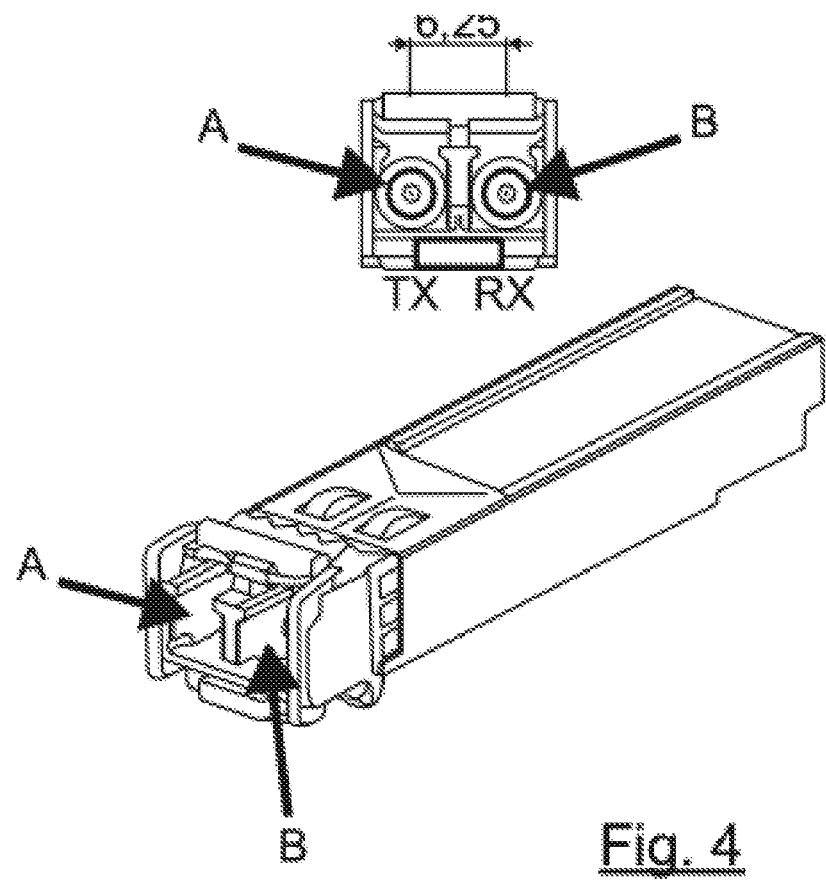
FIG. 4 illustrates an example of mechanical housing of a standard transceiver module.

Finally, as described above, the optical elements implementing the present technique have the advantage of being integrated into an existing mechanical housing of a standard transceiver module, while providing two optical interfaces, for example of the LC receptacle type spaced 6.25 mm apart as shown in the top part of FIG. 4, illustrating the two inputs-outputs A and B of such a transceiver module. The bottom part of FIG. 4 illustrates for its part an example of a transceiver module in perspective.

For this, and as illustrated with FIGS. 6a to 6f, the optical elements implemented in the present technique must be arranged so as to respect predetermined size constraints of the mechanical housing of said transceiver module.

First of all, FIG. 5 illustrates an example of optical assembly AssO of the BOSA (Bidirectional Optical Sub-Assembly) type, according to the prior art, used to produce a bidirectional transceiver module according to the present technique, and particularly comprising a laser and an Rx receiver module, as well as Tx/Rx connectors to the electronic portion of the transceiver module. This "basic" optical assembly is therefore completed, according to the various embodiments of the present technique described above, to provide an optronic transceiver module with two bidirectional optical interfaces and supervised differentially.

FIGS. 6a to 6f show various variants of arrangement inside the optronic transceiver module for the various optical elements/components implementing the present technique and making it possible to modify the mechanical housing of the optronic transceiver module itself, so as to be able to implement the present technique in a standard housing and also without modifying the OLT network equipment.

Figure 6A:
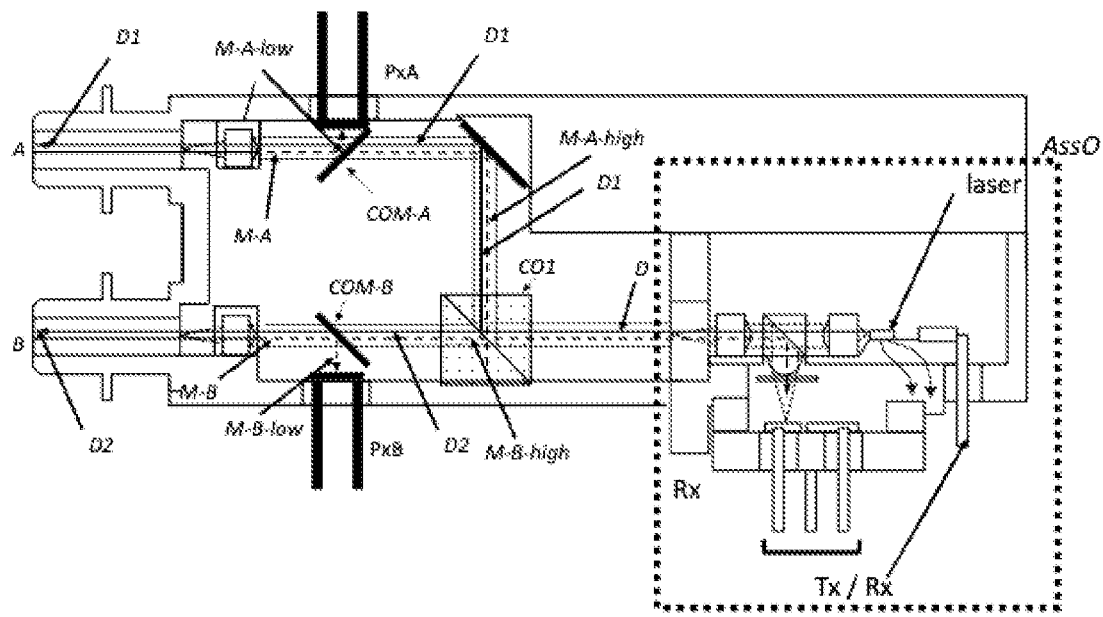
FIG. 6a to FIG. 6f illustrate examples of arrangement of components in an optronic transceiver module according to various variants of the technique proposed.

According to FIG. 6a, the elements of the present technique are therefore illustrated on the left part of the optical assembly AssO described above, namely:
  a main optical coupler CO1,
  a first uplink optical coupler COM-A and a second uplink optical coupler COM-B,
  two photodiodes PxA and PxB.

In addition, the uplink signals M-A and M-B, respectively via the optical fibres A and B, then the signals M-A-low and M-A-high, M-B-low and M-B-high split by the uplink optical couplers COM-A and COM-B, are illustrated in dotted lines. The downlink signals, from the laser (D), and from the main optical coupler CO1, i.e. D1 and D2, are illustrated in bold lines.

This first arrangement makes it possible to implement the development in a standard transceiver module housing.

Figure 6B:
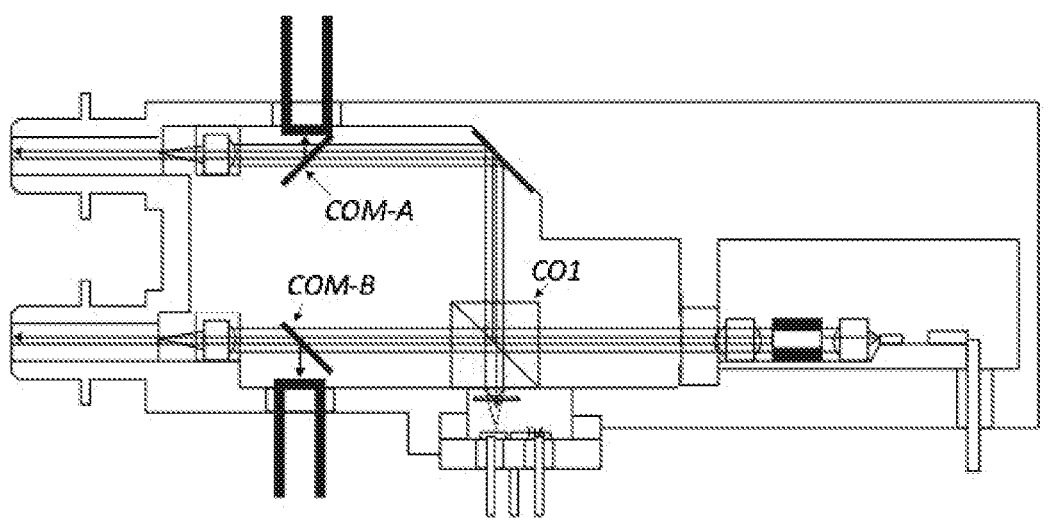

According to the variant illustrated in FIG. 6b, the optical portions corresponding respectively to the transmission and the reception are split so as not to need filtering elements before the laser, making it possible to limit the attenuation. Indeed, the signal beam transmitted by the laser is directly transmitted to the main optical coupler because the optical signal received is deviated for processing before arriving in the basic optical assembly described above, which is therefore modified according to this variant. An isolator is provided before the laser in order to prevent it from receiving uplink signal residues. The remainder of the elements implementing the development, as described above in relation to FIG. 6a, are similar and not described in detail again here.

Figure 6C:
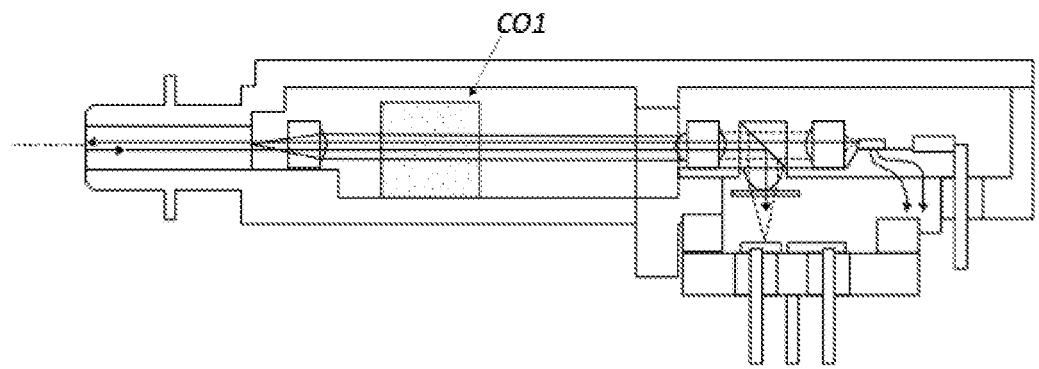
Figure 6D:
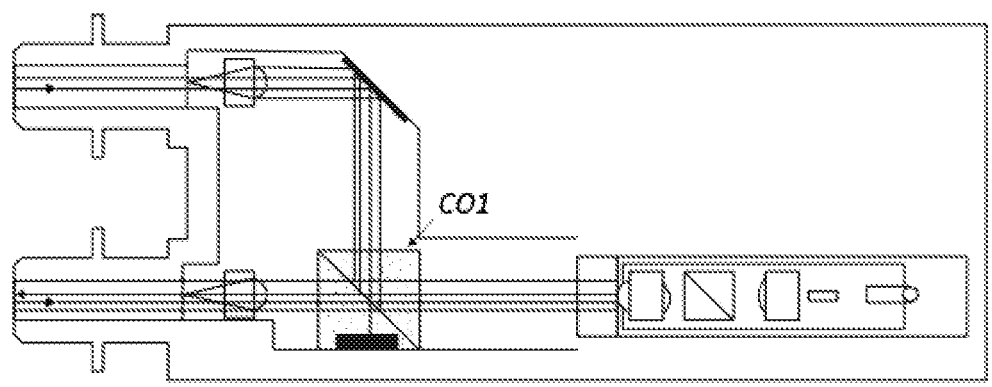

FIGS. 6c and 6d (sectional view and top view) illustrate another variant, with an assembly in two perpendicular planes, making it possible to gain compactness and ease of integration. Thus, the elements implementing the present technique, and particularly the main coupler and the first and second uplink couplers are implemented in a horizontal plane whereas the elements making it possible to split the uplink and downlink signals are implemented in a vertical plane.

Figure 6E:
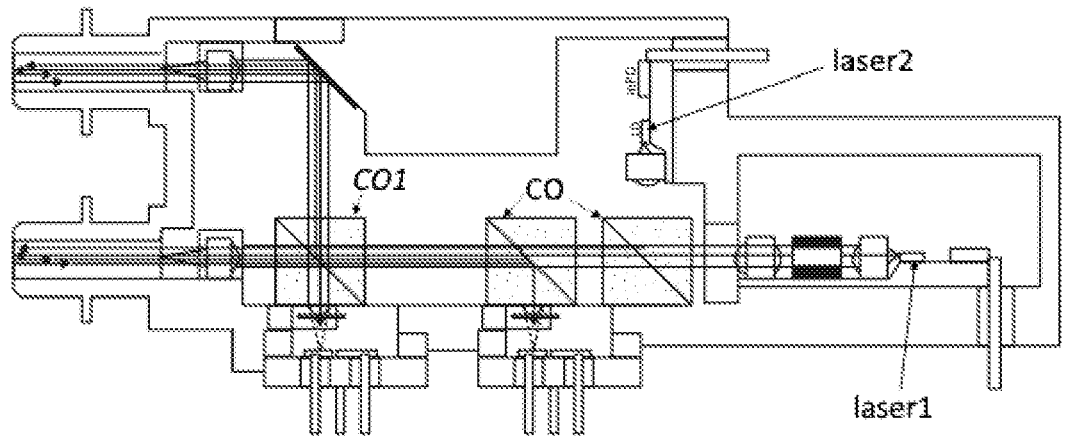
Figure 6F:
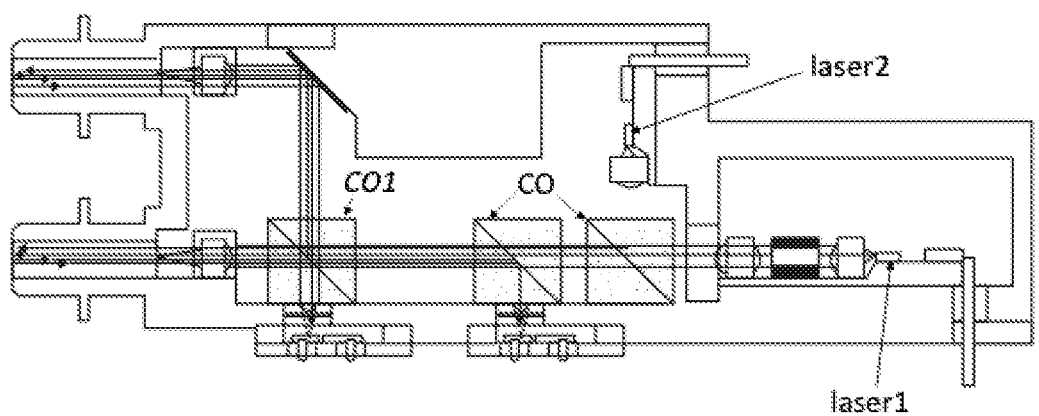

FIGS. 6e and 6f also illustrate another variant, adapted to a multi-PON technique, such as already described above, wherein two lasers are implemented, for each of the wavelengths provided.

FIG. 6f corresponds to the same implementation as FIG. 6e, but with the connectors directed in a perpendicular plane, so as to make it possible to gain extra space.

It should be noted that, in FIGS. 6c to 6f, the uplink optical filtering modules are not illustrated (and particularly the photodiodes) but they are implemented as for FIGS. 6a and 6b and the embodiments described above.

The invention claimed is:

1. An optronic transceiver module capable of transmitting at least one downlink optical signal respectively in at least one optical fibre and of receiving at least one uplink optical signal via the at least one optical fibre, comprising an optical interface comprising at least one laser capable of generating the at least one downlink optical signal and:
    at least one m to n optical coupler, with m between 1 and n, referred to as main optical coupler, capable of splitting the at least one downlink optical signal generated by the laser into n downlink optical signals to be transmitted respectively in n optical fibres;
    at least one first uplink optical coupler capable of splitting the at least one uplink optical signal received via a first optical fibre into two optical signals split according to a predetermined reference power ratio for the split optical signals, the first uplink optical coupler delivering a first low-power signal and a first high-power signal;
    at least one first power measurement photodiode delivering a power measurement associated with the first low-power signal;
    at least one second uplink optical coupler capable of splitting an uplink optical signal received via at least a second optical fibre into two optical signals split according to a predetermined reference power ratio for the split optical signals, the at least one second uplink optical coupler delivering a second low-power signal and a second high-power signal;
    at least one second power measurement photodiode delivering a power measurement associated with the second low-power signal; and
    the main optical coupler being capable of aggregating the first high-power optical signal and the second high-power signal, into an aggregated uplink optical signal.

2. The optronic transceiver module according to claim 1, wherein the main optical coupler is a 1 to 2 coupler.

3. The optronic transceiver module according to claim 1, comprising two lasers generating respectively a first optical signal having a first wavelength for a first bitrate and a second optical signal having a second wavelength for a second bitrate and wherein the main optical coupler is capable of:
    receiving an optical signal corresponding to a combination of the first and second optical signals generated by the two lasers;
    splitting the optical signal corresponding to a combination of the first and second optical signals generated by the two lasers into n downlink optical signals to be transmitted respectively in n optical fibres;
    receiving n first and/or second high-power optical signals each corresponding to a combination of two optical signals received having respectively a first and a second wavelength;
    aggregating the n first and/or second high-power optical signals each corresponding to a combination of two optical signals received having respectively a first and a second wavelength, into an uplink optical signal having a first and a second wavelength; and
    wherein the optronic transceiver module comprises at least one first uplink optical filtering module delivering a power measurement associated with each low-power optical signal for each first and second wavelength.

4. The optronic transceiver module according to claim 3, wherein the first uplink filtering module comprises:
    an optical coupler capable of splitting the low-power optical signal having a first and a second wavelength delivered by the first uplink optical coupler into two signals each having a first and a second wavelength;
    two optical filters delivering, from respectively two signals substantially of the same power each having a first and a second wavelength, respectively a first signal to be measured having the first wavelength and a second signal to be measured having the second wavelength; and
    two photodiodes delivering respectively a power measurement associated with the first signal to be measured and with the second signal to be measured delivered by the optical fibres.

5. The optronic transceiver module according to claim 3, wherein the first uplink filtering module comprises:
    an optical multiplexer capable of splitting the low-power optical signal having a first and a second wavelength delivered by the first uplink optical coupler into a first signal to be measured having the first wavelength and a second signal to be measured having the second wavelength; and
    two photodiodes delivering respectively a power measurement associated with the first signal to be measured and with the second signal to be measured delivered by the optical filters.

6. The optronic transceiver module according to claim 3, comprising a second uplink optical filtering module delivering a power measurement associated with each low-power optical signal for each first and second wavelength.

7. The optronic transceiver module according to claim 1, wherein the main optical coupler is a 2 to 2 coupler having a first input-output for transmitting and receiving the optical signals of the first fibre, a second input-output for transmitting and receiving the optical signals of the second fibre, a third input-output for obtaining the at least one downlink optical signal generated by the laser and delivering the aggregated uplink optical signal and a fourth input-output connected to an external supervision input-output of the optronic transceiver module.

8. The optronic transceiver module according to claim 1, wherein the main optical coupler, the at least one first uplink optical coupler and the at least one first power measurement photodiode are arranged in the transceiver module so as to fit in the predetermined size constraints of a mechanical housing of the transceiver module.

9. The optronic transceiver module according to claim 1, wherein the optronic transceiver module is connected to an optical line terminal and wherein at least one power measurement delivered by the at least one first power measurement photodiode is transmitted, in a diagnostic parameter, to the optical line terminal.

10. The optronic transceiver module according to claim 3, wherein the first bitrate and the second bitrate are one of one gigabit or ten gigabits.

\* \* \* \* \*